(12) United States Patent
Fattal et al.

(10) Patent No.: US 10,948,772 B2
(45) Date of Patent: Mar. 16, 2021

(54) MULTIVIEW BACKLIGHT, MULTIVIEW DISPLAY AND METHOD EMPLOYING OFFSET MULTIBEAM ELEMENTS

(71) Applicant: LEIA INC., Menlo Park, CA (US)

(72) Inventors: David A. Fattal, Mountain View, CA (US); John Rayfield, Menlo Park, CA (US)

(73) Assignee: LEIA INC., Menlo Park, CA (US)

( * ) Notice: Subject to any disclaimer, the term of this patent is extended or adjusted under 35 U.S.C. 154(b) by 0 days.

(21) Appl. No.: 16/712,556

(22) Filed: Dec. 12, 2019

(65) Prior Publication Data

US 2020/0117053 A1    Apr. 16, 2020

Related U.S. Application Data

(63) Continuation of application No. PCT/US2017/038013, filed on Jun. 16, 2017.

(51) Int. Cl.
*G02F 1/1335* (2006.01)
*G02F 1/13357* (2006.01)
*F21V 8/00* (2006.01)

(52) U.S. Cl.
CPC ..... *G02F 1/133605* (2013.01); *G02B 6/0036* (2013.01); *G02F 2001/133607* (2013.01); *G02F 2201/305* (2013.01)

(58) Field of Classification Search
CPC .. G02B 5/1866; G02B 5/1819; G02B 6/0038; G02B 27/4205
See application file for complete search history.

(56) References Cited

U.S. PATENT DOCUMENTS 9,128,226 B2    9/2015 Fattal et al.
9,201,270 B2   12/2015 Fattal et al.
(Continued)

FOREIGN PATENT DOCUMENTS

JP    2010210904 A    9/2010
JP    2017032663 A    2/2017
WO    2017039756 A1    3/2017

OTHER PUBLICATIONS

International Search Report and Written Opinion (ISRWO) by International Searching Authority (ISA) Korean Intellectual Property Office (KIPO), dated Mar. 16, 2018 (15 pages) for counterpart parent International Application No. PCT/US2017/038013.
(Continued)

*Primary Examiner* — Evan P Dzierzynski
*Assistant Examiner* — Keith G. Delahoussaye
(74) *Attorney, Agent, or Firm* — J. Michael Johnson

(57) ABSTRACT

A multiview backlight and a multiview display employ a multibeam element configured to provide a tilted plurality of directional light beams having different principal angular directions corresponding to view directions of a plurality of view in a view zone. The multiview backlight includes a light guide configured to guide light as guided light and the multibeam element configured to couple out a portion of the guided light as the tilted plurality of directional light beams. A tilt angle of the tilted directional light beam plurality is provided by an offset of the multibeam element and a corresponding multiview pixel. The multiview display includes an array of multibeam elements and an array of multiview pixels.

20 Claims, 6 Drawing Sheets

(56) References Cited

U.S. PATENT DOCUMENTS

| | | |
|---|---|---|
| 9,298,168 B2 | 3/2016 | Taff et al. |
| 9,389,415 B2 | 7/2016 | Fattal et al. |
| 9,459,461 B2 | 10/2016 | Santori et al. |
| 9,557,466 B2 | 1/2017 | Fattal |
| 9,785,119 B2 | 10/2017 | Taff et al. |
| 2007/0258140 A1 | 11/2007 | Shestak et al. |
| 2008/0285282 A1 | 11/2008 | Karman et al. |
| 2009/0040426 A1 | 2/2009 | Mather et al. |
| 2010/0118218 A1 | 5/2010 | Eichenlaub |
| 2010/0141868 A1* | 6/2010 | St. Hilaire ........... G02B 6/0061 349/62 |
| 2013/0169694 A1* | 7/2013 | Chen ................... G02B 6/0035 345/690 |
| 2013/0328866 A1 | 12/2013 | Woodgate et al. |
| 2015/0036068 A1* | 2/2015 | Fattal .................. G02B 6/0038 349/15 |
| 2016/0033705 A1* | 2/2016 | Fattal .................. G02B 5/1866 349/15 |
| 2017/0363794 A1* | 12/2017 | Wan ....................... G02B 30/00 |
| 2018/0011237 A1 | 1/2018 | Fattal |
| 2018/0188441 A1 | 7/2018 | Fattal |
| 2018/0188691 A1 | 7/2018 | Fattal |
| 2018/0196194 A1 | 7/2018 | Fattal |
| 2018/0306965 A1* | 10/2018 | Fattal .................. G02B 6/0036 |
| 2019/0025494 A1 | 1/2019 | Fattal et al. |
| 2019/0155105 A1 | 5/2019 | Aieta et al. |

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.

\* cited by examiner

MULTIVIEW BACKLIGHT, MULTIVIEW DISPLAY AND METHOD EMPLOYING OFFSET MULTIBEAM ELEMENTS

CROSS-REFERENCE TO RELATED APPLICATIONS

This application is a continuation patent application of and claims the benefit of priority to International Application No. PCT/US2017/038013, filed Jun. 16, 2017, the entirety of which is incorporated by reference herein.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Most commonly employed electronic displays include the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). Generally, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

To overcome the limitations of passive displays associated with emitted light, many passive displays are coupled to an external light source. The coupled light source may allow these otherwise passive displays to emit light and function substantially as an active display. Examples of such coupled light sources are backlights. A backlight may serve as a source of light (often a panel backlight) that is placed behind an otherwise passive display to illuminate the passive display. For example, a backlight may be coupled to an LCD or an EP display. The backlight emits light that passes through the LCD or the EP display. The light emitted is modulated by the LCD or the EP display and the modulated light is then emitted, in turn, from the LCD or the EP display. Often backlights are configured to emit white light. Color filters are then used to transform the white light into various colors used in the display. The color filters may be placed at an output of the LCD or the EP display (less common) or between the backlight and the LCD or the EP display, for example. Alternatively, the various colors may be implemented by field-sequential illumination of a display using different colors, such as primary colors.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Figure 1A:
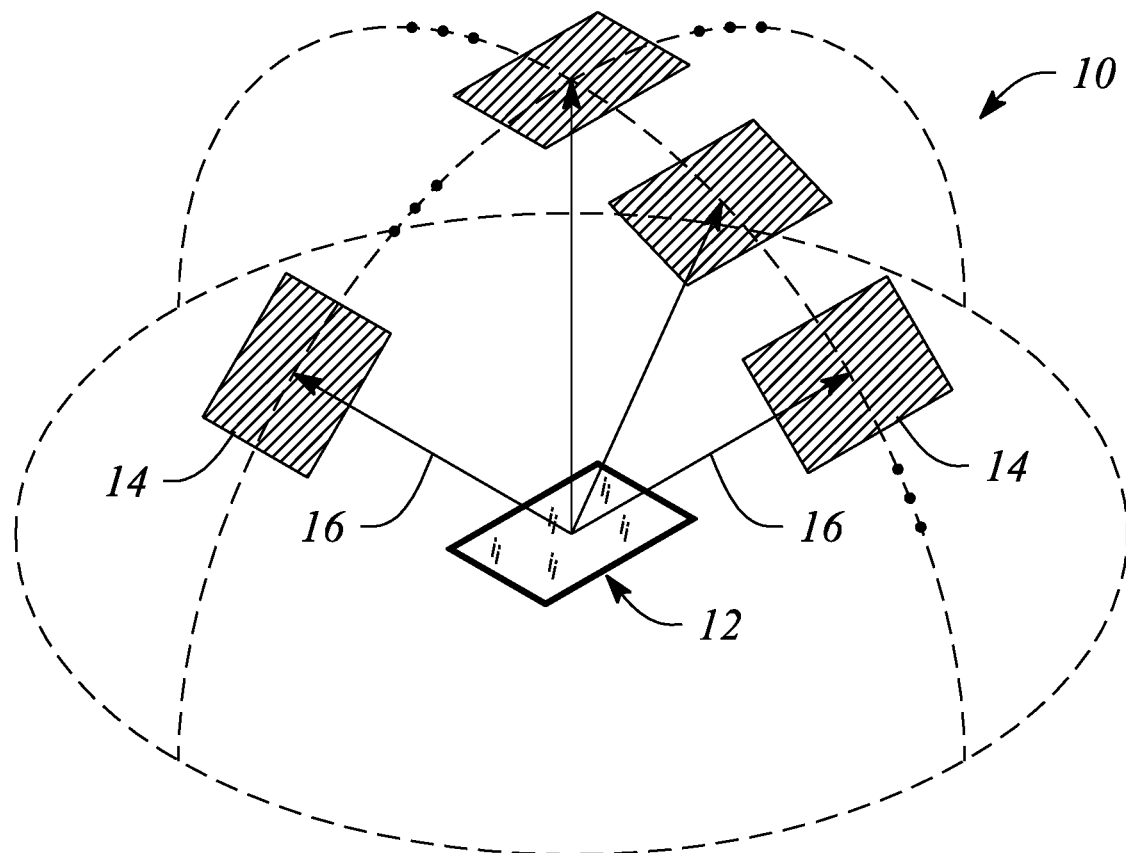
FIG. 1A illustrates a perspective view of a multiview display in an example, according to an embodiment consistent with the principles described herein.

Certain examples and embodiments have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide a multiview backlight having an offset multibeam element, the multiview backlight having application to a multiview or three-dimensional (3D) display with one or more view zones. In particular, embodiments consistent with the principles described herein provide a multiview backlight employing an offset multibeam element configured to provide a tilted plurality of directional light beams having a predetermined tilt angle toward a view zone of a multiview display. For example, a multibeam element may be offset from a centerline of a multiview pixel and this offset may provide the predetermined tilt angle of the tilted plurality of directional light beams. Further, the tilted plurality of directional light beams provided by the offset multiview element may have a plurality of different principal angular directions about or relative to the predetermined tilt angle. According to various embodiments, the tilted plurality of directional light beams having the different principal angular directions may correspond to different view directions (in a set of views of a multiview image) within the view zone of the multiview display. Uses of multiview displays employing the multiview backlight described herein include, but are not limited to, mobile telephones (e.g., smart phones), watches, tablet computes, mobile computers (e.g., laptop computers), personal computers and computer monitors, automobile display consoles, cameras displays, and various other mobile as well as substantially non-mobile display applications and devices.

According to various embodiments, the multiview display employing the offset multibeam element may be configured to provide a plurality of view zones that are spatially separated from one another. For example, the multiview display may provide a pair of view zones. The pair of view zones may be configured to provide different views to a driver and a passenger in an automobile, for example. In particular, a first set of tilted directional light beam pluralities having a first tilt angle may provide a first image in a first view zone, while a second set of tilted directional light beam pluralities having a second tilt angle may provide a second image in a second view zone. The first view zone may correspond to a view zone visible to the driver and the second view zone may be that of or visible to a passenger, for example. Further, light beams of the tilted plurality of directional light beams in or corresponding to a given view zone may have different principal angular directions from one another. The different principal angular directions of the tilted plurality of directional light beams may correspond to different view directions of a set of views of a multiview image being displayed in the respective first and second view zones, in some embodiments.

Herein, a 'multiview display' is defined as an electronic display or display system configured to provide different views of a multiview image in different view directions. FIG. 1A illustrates a perspective view of a multiview display 10 in an example, according to an embodiment consistent with the principles described herein. As illustrated in FIG. 1A, the multiview display 10 comprises a screen 12 to display a multiview image to be viewed. The screen 12 may be a display screen of a telephone (e.g., mobile telephone, smart phone, etc.), a tablet computer, a laptop computer, a computer monitor of a desktop computer, a camera display, or an electronic display of substantially any other device, for example. The multiview display 10 provides different views 14 of the multiview image in different view directions 16 relative to the screen 12. The view directions 16 are illustrated as arrows extending from the screen 12 in various different principal angular directions; the different views 14 are illustrated as shaded polygonal boxes at the termination of the arrows (i.e., depicting the view directions 16); and only four views 14 and four view directions 16 are illustrated, all by way of example and not limitation. Note that while the different views 14 are illustrated in FIG. 1A as being above the screen, the views 14 actually appear on or in a vicinity of the screen 12 when the multiview image is displayed on the multiview display 10. Depicting the views 14 above the screen 12 is only for simplicity of illustration and is meant to represent viewing the multiview display 10 from a respective one of the view directions 16 corresponding to a particular view 14.

Figure 1B:
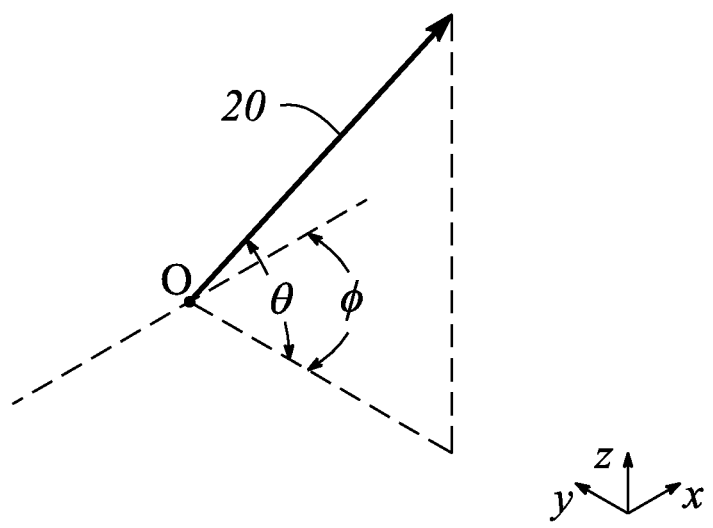
FIG. 1B illustrates a graphical representation of angular components of a light beam having a particular principal angular direction corresponding to a view direction of a multiview display in an example, according to an embodiment consistent with the principles described herein.

A view direction or equivalently a light beam having a direction (i.e., a directional light beam) corresponding to a view direction of a multiview display generally has a principal angular direction given by angular components $\{\theta, \phi\}$, by definition herein. The angular component $\theta$ is referred to herein as the 'elevation component' or 'elevation angle' of the light beam. The angular component $\phi$ is referred to as the 'azimuth component' or 'azimuth angle' of the light beam. By definition, the elevation angle $\theta$ is an angle in a vertical plane (e.g., perpendicular to a plane of the multiview display screen while the azimuth angle $\phi$ is an angle in a horizontal plane (e.g., parallel to the multiview display screen plane). FIG. 1B illustrates a graphical representation of the angular components $\{\theta, \phi\}$ of a light beam 20 having a particular principal angular direction corresponding to a view direction (e.g., view direction 16 in FIG. 1A) of a multiview display in an example, according to an embodiment consistent with the principles described herein. In addition, the light beam 20 is emitted or emanates from a particular point, by definition herein. That is, by definition, the light beam 20 has a central ray associated with a particular point of origin within the multiview display. FIG. 1B also illustrates the light beam (or view direction) point of origin O.

Further herein, the term 'multiview' as used in the terms 'multiview image' and 'multiview display' is defined as a plurality of views representing different perspectives or including angular disparity between views of the view plurality. In addition, herein the term 'multiview' explicitly includes more than two different views (i.e., a minimum of three views and generally more than three views), by definition herein. As such, 'multiview display' as employed herein is explicitly distinguished from a stereoscopic display that includes only two different views to represent a scene or an image. Note however, while multiview images and multiview displays include more than two views, by definition herein, multiview images may be viewed (e.g., on a multiview display) as a stereoscopic pair of images by selecting only two of the multiview views to view at a time (e.g., one view per eye).

A 'multiview pixel' is defined herein as a set of sub-pixels representing 'view' pixels in each of a similar plurality of different views of a multiview display. In particular, a multiview pixel may have an individual sub-pixel corresponding to or representing a view pixel in each of the different views of the multiview image. Moreover, the sub-pixels of the multiview pixel are so-called 'directional pixels' in that each of the sub-pixels is associated with a predetermined view direction of a corresponding one of the different views, by definition herein. Further, according to various examples and embodiments, the different view pixels represented by the sub-pixels of a multiview pixel may have equivalent or at least substantially similar locations or coordinates in each of the different views. For example, a first multiview pixel may have individual sub-pixels corresponding to view pixels located at $\{x_1, y_1\}$ in each of the different views of a multiview image, while a second multiview pixel may have individual sub-pixels corresponding to view pixels located at $\{x_2, y_2\}$ in each of the different views, and so on.

In some embodiments, a number of sub-pixels in a multiview pixel may be equal to a number of views of the multiview display. For example, the multiview pixel may provide sixty-four (64) sub-pixels in associated with a multiview display having 64 different views. In another example, the multiview display may provide an eight by four array of views (i.e., 32 views) and the multiview pixel may include thirty-two 32 sub-pixels (i.e., one for each view). Additionally, each different sub-pixel may have an associated direction (e.g., light beam principal angular direction)

that corresponds to a different one of the view directions corresponding to the 64 different views, for example. Further, according to some embodiments, a number of multiview pixels of the multiview display may be substantially equal to a number of 'view' pixels (i.e., pixels that make up a selected view) in the multiview display views. For example, if a view includes six hundred forty by four hundred eighty view pixels (i.e., a 640×480 view resolution), the multiview display may have three hundred seven thousand two hundred (307,200) multiview pixels. In another example, when the views include one hundred by one hundred pixels, the multiview display may include a total of ten thousand (i.e., 100×100=10,000) multiview pixels.

Herein, a 'light guide' is defined as a structure that guides light within the structure using total internal reflection. In particular, the light guide may include a core that is substantially transparent at an operational wavelength of the light guide. In various examples, the term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

Further herein, the term 'plate' when applied to a light guide as in a 'plate light guide' is defined as a piece-wise or differentially planar layer or sheet, which is sometimes referred to as a 'slab' guide. In particular, a plate light guide is defined as a light guide configured to guide light in two substantially orthogonal directions bounded by a top surface and a bottom surface (i.e., opposite surfaces) of the light guide. Further, by definition herein, the top and bottom surfaces are both separated from one another and may be substantially parallel to one another in at least a differential sense. That is, within any differentially small section of the plate light guide, the top and bottom surfaces are substantially parallel or co-planar.

In some embodiments, the plate light guide may be substantially flat (i.e., confined to a plane) and therefore, the plate light guide is a planar light guide. In other embodiments, the plate light guide may be curved in one or two orthogonal dimensions. For example, the plate light guide may be curved in a single dimension to form a cylindrical shaped plate light guide. However, any curvature has a radius of curvature sufficiently large to ensure that total internal reflection is maintained within the plate light guide to guide light.

Herein, a 'diffraction grating' is generally defined as a plurality of features (i.e., diffractive features) arranged to provide diffraction of light incident on the diffraction grating. In some examples, the plurality of features may be arranged in a periodic or quasi-periodic manner having one or more grating spacings between pairs of the features. For example, the diffraction grating may include a plurality of features (e.g., a plurality of grooves or ridges in a material surface) arranged in a one-dimensional (1D) array. In other examples, the diffraction grating may be a two-dimensional (2D) array of features. The diffraction grating may be a 2D array of bumps on or holes in a material surface, for example.

As such, and by definition herein, the 'diffraction grating' is a structure that provides diffraction of light incident on the diffraction grating. If the light is incident on the diffraction grating from a light guide, the provided diffraction or diffractive scattering may result in, and thus be referred to as, 'diffractive coupling' in that the diffraction grating may couple light out of the light guide by diffraction. The diffraction grating also redirects or changes an angle of the light by diffraction (i.e., at a diffractive angle). In particular, as a result of diffraction, light leaving the diffraction grating generally has a different propagation direction than a propagation direction of the light incident on the diffraction grating (i.e., incident light). The change in the propagation direction of the light by diffraction is referred to as 'diffractive redirection' herein. Hence, the diffraction grating may be understood to be a structure including diffractive features that diffractively redirects light incident on the diffraction grating and, if the light is incident from a light guide, the diffraction grating may also diffractively couple out the light from the light guide.

Further, by definition herein, the features of a diffraction grating are referred to as 'diffractive features' and may be one or more of at, in and on a material surface (i.e., a boundary between two materials). The surface may be a surface of a light guide, for example. The diffractive features may include any of a variety of structures that diffract light including, but not limited to, one or more of grooves, ridges, holes and bumps at, in or on the surface. For example, the diffraction grating may include a plurality of substantially parallel grooves in the material surface. In another example, the diffraction grating may include a plurality of parallel ridges rising out of the material surface. The diffractive features (e.g., grooves, ridges, holes, bumps, etc.) may have any of a variety of cross sectional shapes or profiles that provide diffraction including, but not limited to, one or more of a sinusoidal profile, a rectangular profile (e.g., a binary diffraction grating), a triangular profile and a saw tooth profile (e.g., a blazed grating).

According to various examples described herein, a diffraction grating (e.g., a diffraction grating of a multibeam element, as described below) may be employed to diffractively scatter or couple light out of a light guide (e.g., a plate light guide) as a light beam. In particular, a diffraction angle $\theta_m$ of or provided by a locally periodic diffraction grating may be given by equation (1) as:

$$\theta_m = \sin^{-1}\left(n\sin\theta_i - \frac{m\lambda}{d}\right) \quad (1)$$

where $\lambda$ is a wavelength of the light, m is a diffraction order, n is an index of refraction of a light guide, d is a distance or spacing between features of the diffraction grating, $\theta_i$ is an angle of incidence of light on the diffraction grating. For simplicity, equation (1) assumes that the diffraction grating is adjacent to a surface of the light guide and a refractive index of a material outside of the light guide is equal to one (i.e., $n_{out}=1$). In general, the diffraction order m is given by an integer. A diffraction angle $\theta_m$ of a light beam produced by the diffraction grating may be given by equation (1) where the diffraction order is positive (e.g., m>0). For example, first-order diffraction is provided when the diffraction order m is equal to one (i.e., m=1).

Figure 2:
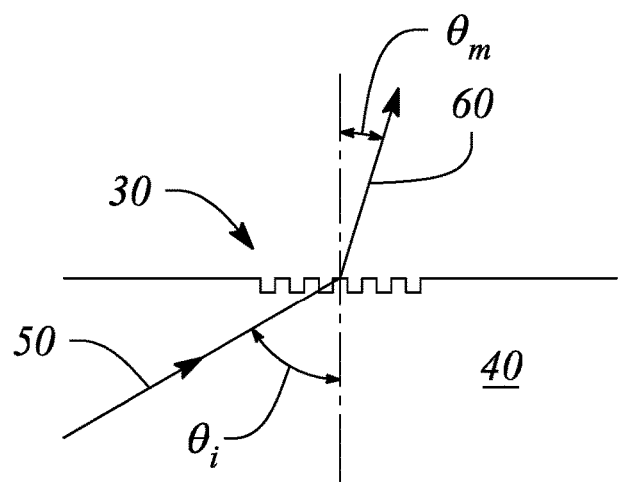
FIG. 2 illustrates a cross sectional view of a diffraction grating in an example, according to an embodiment consistent with the principles described herein.

FIG. 2 illustrates a cross sectional view of a diffraction grating 30 in an example, according to an embodiment consistent with the principles described herein. For example, the diffraction grating 30 may be located on a surface of a light guide 40. In addition, FIG. 2 illustrates a light beam 50 incident on the diffraction grating 30 at an incident angle $\theta_i$. The light beam 50 is a guided light beam within the light guide 40. Also illustrated in FIG. 2 is a coupled-out light beam 60 diffractively produced and coupled-out by the diffraction grating 30 as a result of diffraction of the incident light beam 20. The coupled-out light beam 60 has a diffraction angle $\theta_m$ (or 'principal angular direction' herein) as given by equation (1). The coupled-out light beam 60 may correspond to a diffraction order 'm' of the diffraction grating 30, for example.

By definition herein, a 'multibeam element' is a structure or element of a backlight or a display that produces light that includes a plurality of light beams. In some embodiments, the multibeam element may be optically coupled to a light guide of a backlight to provide the light beams by coupling out a portion of light guided in the light guide. Further, the light beams of the plurality of light beams produced by a multibeam element have different principal angular directions from one another, by definition herein. In particular, by definition, a light beam of the plurality has a predetermined principal angular direction that is different from another light beam of the light beam plurality. As such, light beams of the light beam plurality may be termed 'directional light beams' and the light beam plurality may be referred to as a plurality of 'directional' light beams.

Moreover, the directional light beam plurality may represent a light field. For example, the directional light beam plurality may be confined to a substantially conical region of space or have a predetermined angular spread that includes the principal angular direction of the light beams in the directional light beam plurality. As such, the predetermined angular spread of the light beams in combination (i.e., the directional light beam plurality) may represent the light field. According to various embodiments, the principal angular direction of the various light beams are determined by a characteristic including, but not limited to, a size (e.g., length, width, area, etc.) of the multibeam element. In some embodiments, the multibeam element may be considered an 'extended point light source', i.e., a plurality of point light sources distributed across an extent of the multibeam element, by definition herein. Further, a directional light beam produced by the multibeam element has a principal angular direction given by angular components {$\theta$, $\phi$}, by definition herein, and as described above with respect to FIG. 1B.

Herein a 'collimator' is defined as substantially any optical device or apparatus that is configured to collimate light. For example, a collimator may include, but is not limited to, a collimating mirror or reflector, a collimating lens, and various combinations thereof. In some embodiments, the collimator comprising a collimating reflector may have a reflecting surface characterized by a parabolic curve or shape. In another example, the collimating reflector may comprise a shaped parabolic reflector. By 'shaped parabolic' it is meant that a curved reflecting surface of the shaped parabolic reflector deviates from a 'true' parabolic curve in a manner determined to achieve a predetermined reflection characteristic (e.g., a degree of collimation). Similarly, a collimating lens may comprise a spherically shaped surface (e.g., a biconvex spherical lens).

In some embodiments, the collimator may be a continuous reflector or a continuous lens (i.e., a reflector or lens having a substantially smooth, continuous surface). In other embodiments, the collimating reflector or the collimating lens may comprise a substantially discontinuous surface such as, but not limited to, a Fresnel reflector or a Fresnel lens that provides light collimation. According to various embodiments, an amount of collimation provided by the collimator may vary in a predetermined degree or amount from one embodiment to another. Further, the collimator may be configured to provide collimation in one or both of two orthogonal directions (e.g., a vertical direction and a horizontal direction). That is, the collimator may include a shape in one or both of two orthogonal directions that provides light collimation, according to some embodiments.

Herein, a 'collimation factor' is defined as a degree to which light is collimated. In particular, a collimation factor defines an angular spread of light rays within a collimated beam of light, by definition herein. For example, a collimation factor $\sigma$ may specify that a majority of light rays in a beam of collimated light is within a particular angular spread (e.g., +/− $\sigma$ degrees about a central or principal angular direction of the collimated light beam). The light rays of the collimated light beam may have a Gaussian distribution in terms of angle and the angular spread be an angle determined by at one-half of a peak intensity of the collimated light beam, according to some examples.

Herein, a 'light source' is defined as a source of light (e.g., an optical emitter configured to produce and emit light). For example, the light source may comprise an optical emitter such as a light emitting diode (LED) that emits light when activated or turned on. In particular, herein the light source may be substantially any source of light or comprise substantially any optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by the light source may have a color (i.e., may include a particular wavelength of light), or may be a range of wavelengths (e.g., white light). In some embodiments, the light source may comprise a plurality of optical emitters. For example, the light source may include a set or group of optical emitters in which at least one of the optical emitters produces light having a color, or equivalently a wavelength, that differs from a color or wavelength of light produced by at least one other optical emitter of the set or group. The different colors may include primary colors (e.g., red, green, blue) for example.

Further, as used herein, the article 'a' is intended to have its ordinary meaning in the patent arts, namely 'one or more'. For example, 'a multibeam element' means one or more multibeam elements and as such, 'the multibeam element' means 'the multibeam element(s)' herein. Also, any reference herein to 'top', 'bottom', 'upper', 'lower', 'up', 'down', 'front', back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 3:
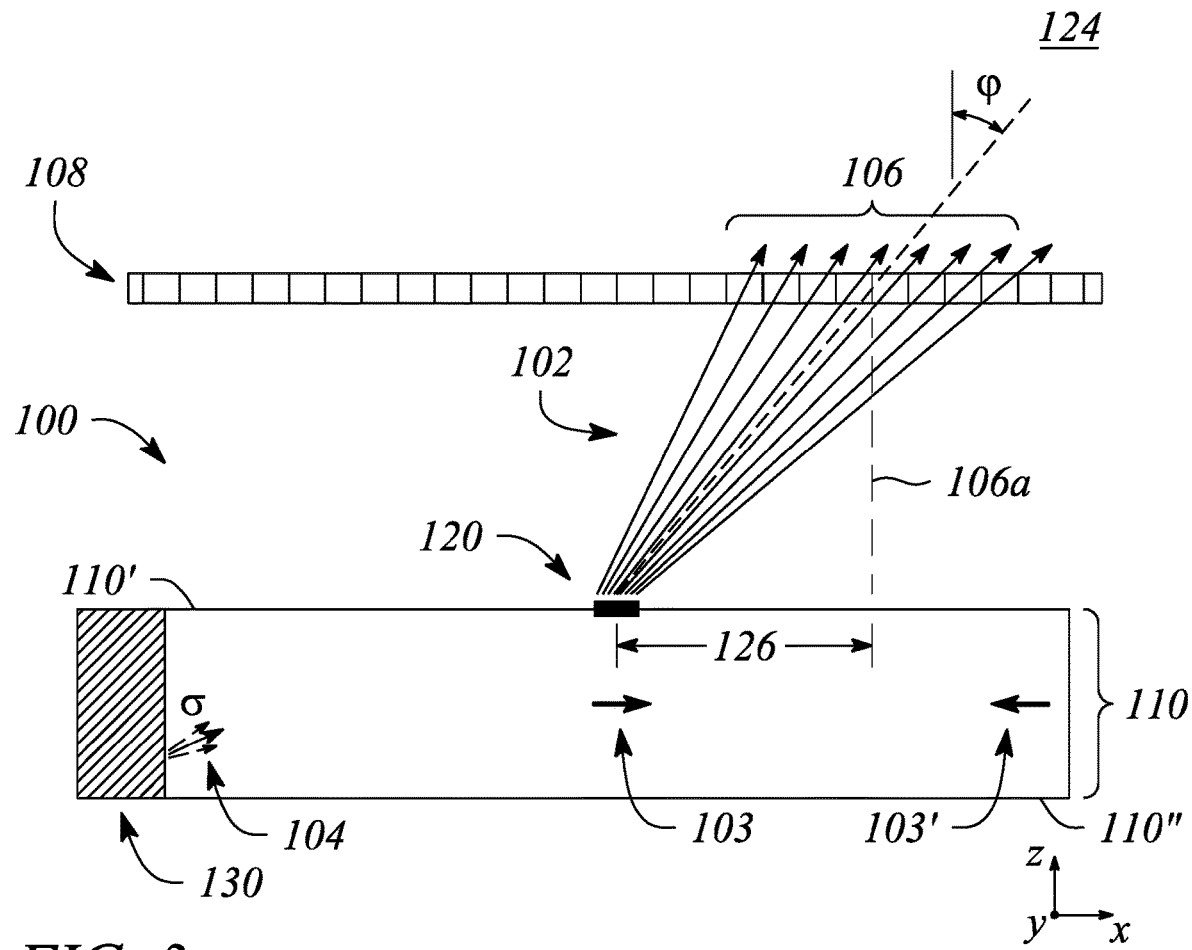
FIG. 3 illustrates a cross sectional view of a multiview backlight in an example, according to an embodiment consistent with the principles described herein.
Figure 4A:
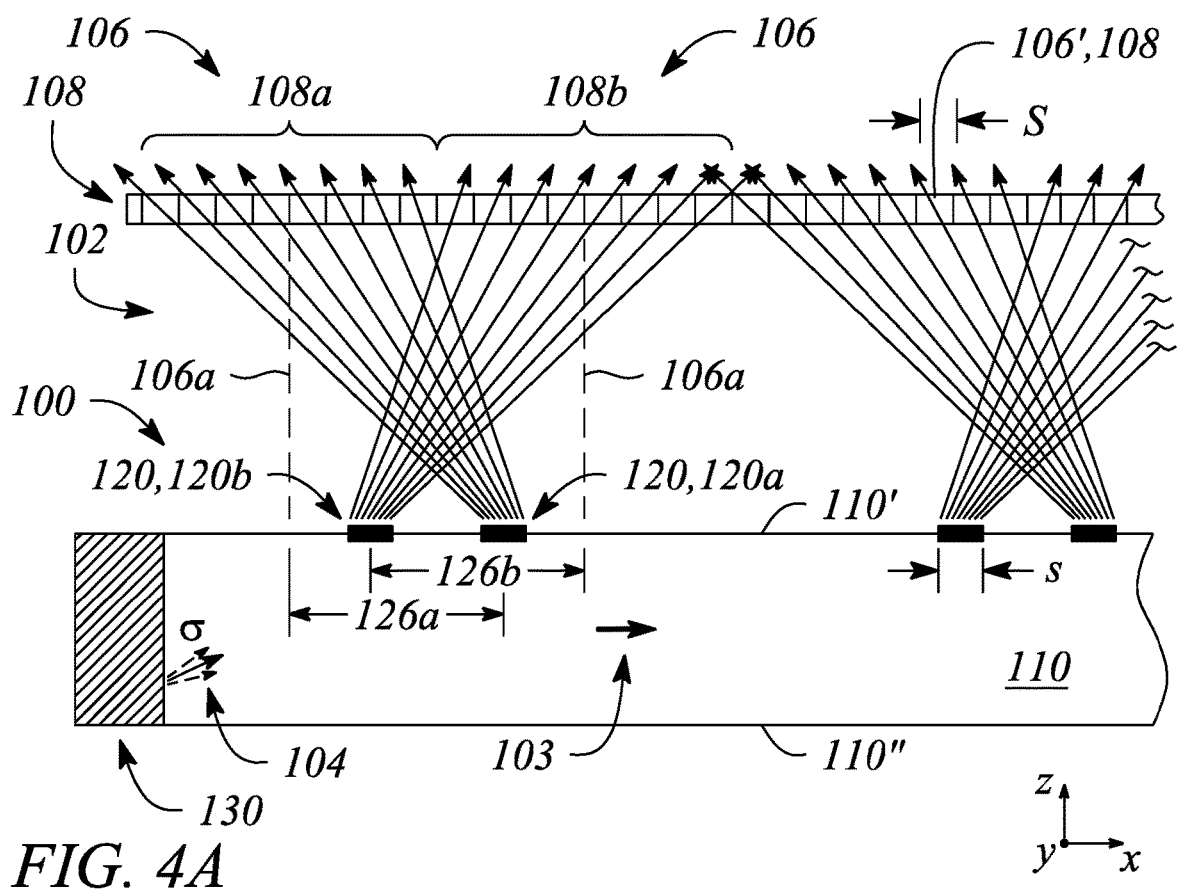
FIG. 4A illustrates a cross sectional view of a multiview backlight in an example, according to an embodiment consistent with the principles described herein.
Figure 4B:
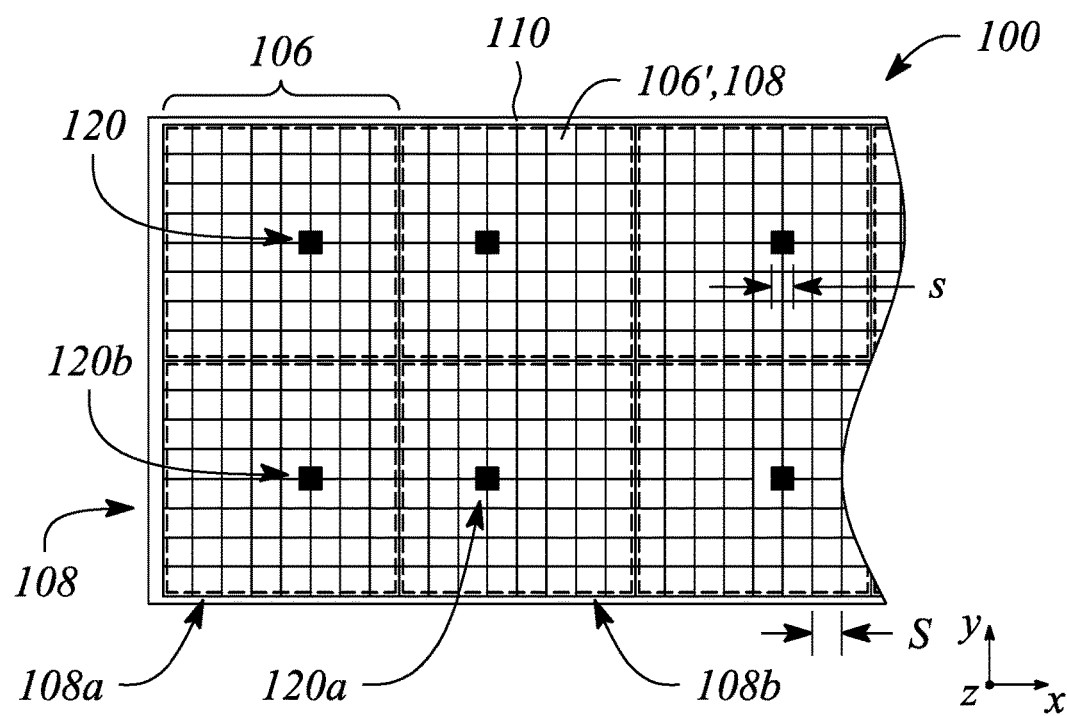
FIG. 4B illustrates a plan view of a multiview backlight in an example, according to an embodiment consistent with the principles described herein.
Figure 4C:
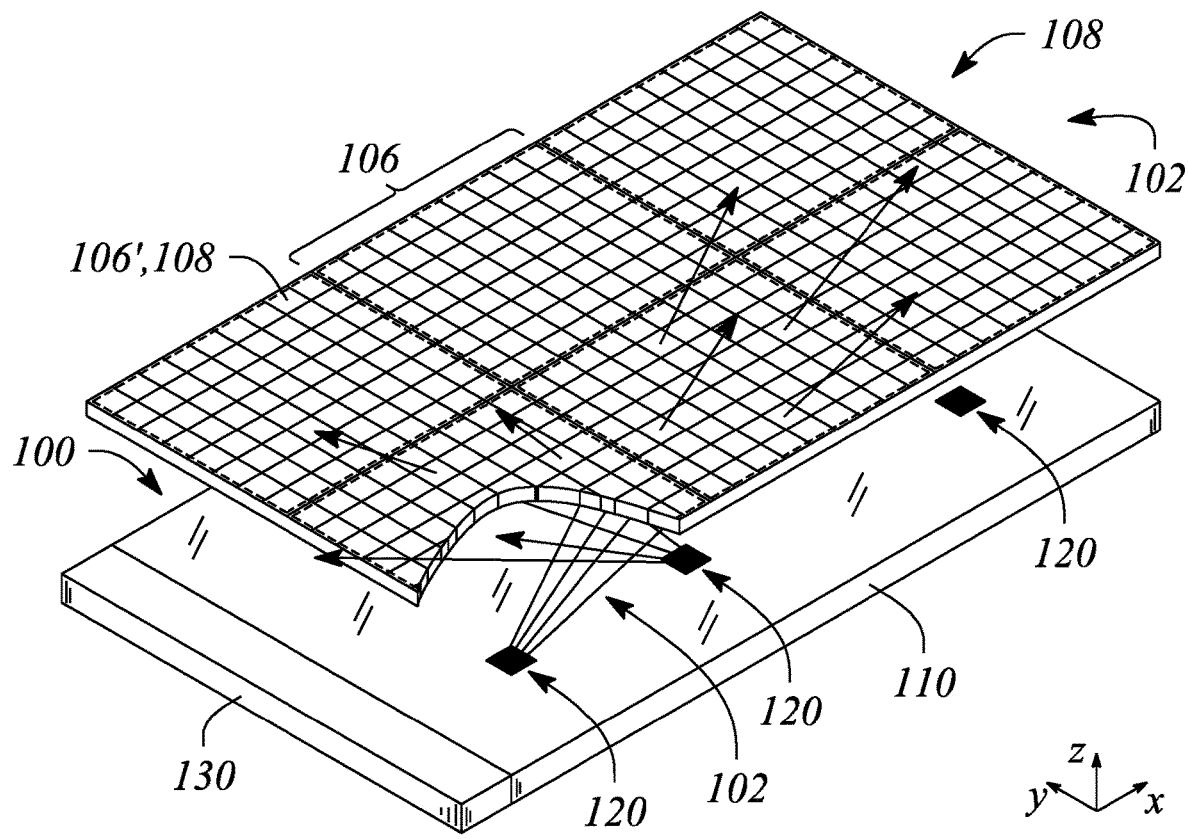
FIG. 4C illustrates a perspective view of a multiview backlight of in an example, according to an embodiment consistent with the principles described herein.

According to some embodiments of the principles described herein, a multiview backlight is provided. FIG. 3 illustrates a cross sectional view of a multiview backlight 100 in an example, according to an embodiment consistent with the principles described herein. FIG. 4A illustrates a cross sectional view of a multiview backlight 100 in another example, according to an embodiment consistent with the principles described herein. FIG. 4B illustrates a plan view of a multiview backlight 100, according to an embodiment consistent with the principles described herein. FIG. 4C illustrates a perspective view of a multiview backlight 100, according to an embodiment consistent with the principles described herein. The perspective view in FIG. 4C is illustrated with a partial cut-away to facilitate discussion herein.

As illustrated, the multiview backlight 100 is configured to provide a tilted plurality of directional light beams 102, directional light beams 102 of the tilted plurality having different principal angular directions from one another (e.g., as a light field). In particular, the provided tilted plurality of directional light beams 102 is directed away from the multiview backlight 100. In some embodiments, the tilted plurality of directional light beams 102 may be modulated (e.g., using light valves, as described below) to facilitate the display of information having 3D or multiview content such as, but not limited to, a multiview image.

Further, according to various embodiments, the tilted plurality of directional light beams 102 has a tilt toward a view zone, e.g., a view zone or region of a multiview display that employs the multiview backlight 100. The tilt is defined or characterized in terms of a tilt angle φ of the tilted directional light beam plurality relative to or away from a direction that is perpendicular to a surface (i.e., a surface normal) of the multiview backlight 100. For example, the tilt and thus the tilt angle φ may be defined with respect to a central axis of the tilted plurality of directional light beams 102. In FIG. 3, a dashed line having the tilt angle φ represents a central axis of the tilted plurality of directional light beams 102. A view zone 124 is also illustrated in FIG. 3.

As illustrated in FIGS. 3 and 4A-4C, the multiview backlight 100 comprises a light guide 110. The light guide 110 may be a plate light guide, according to some embodiments. The light guide 110 is configured to guide light along a length of the light guide 110 as guided light 104. For example, the light guide 110 may include a dielectric material configured as an optical waveguide. The dielectric material may have a first refractive index that is greater than a second refractive index of a medium surrounding the dielectric optical waveguide. The difference in refractive indices is configured to facilitate total internal reflection of the guided light 104 according to one or more guided modes of the light guide 110, for example.

In some embodiments, the light guide 110 may be a slab or plate optical waveguide comprising an extended, substantially planar sheet of optically transparent, dielectric material (i.e., a plate light guide). The substantially planar sheet of dielectric material is configured to guide the guided light 104 (e.g., as a guided light beam) using total internal reflection. According to various examples, the optically transparent material of the light guide 110 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some examples, the light guide 110 may further include a cladding layer (not illustrated) on at least a portion of a surface (e.g., one or both of the top surface and the bottom surface) of the light guide 110. The cladding layer may be used to further facilitate total internal reflection, according to some examples.

Further, according to some embodiments, the light guide 110 is configured to guide the guided light 104 according to total internal reflection at a non-zero propagation angle between a first surface 110' (e.g., 'front' surface or side) and a second surface 110" (e.g., 'back' surface or side) of the light guide 110. In particular, the guided light 104 propagates by reflecting or 'bouncing' between the first surface 110' and the second surface 110" of the light guide 110 at the non-zero propagation angle. Note, the non-zero propagation angle is not illustrated in FIGS. 3, 4A-4C for simplicity of illustration. However, in FIGS. 3 and 4A a bold arrow depicting a propagation direction 103 illustrates a general propagation direction of the guided light 104 along the light guide length.

As defined herein, a 'non-zero propagation angle' is an angle relative to a surface (e.g., the first surface 110' or the second surface 110") of the light guide 110. Further, the non-zero propagation angle is both greater than zero and less than a critical angle of total internal reflection within the light guide 110, according to various embodiments. For example, the non-zero propagation angle of the guided light 104 may be between about ten (10) degrees and about fifty (50) degrees or, in some examples, between about twenty (20) degrees and about forty (40) degrees, or between about twenty-five (25) degrees and about thirty-five (35) degrees. For example, the non-zero propagation angle may be about thirty (30) degrees. In other examples, the non-zero propagation angle may be about 20 degrees, or about 25 degrees, or about 35 degrees. Moreover, a specific non-zero propagation angle may be chosen (e.g., arbitrarily) for a particular implementation as long as the specific non-zero propagation angle is chosen to be less than the critical angle of total internal reflection within the light guide 110.

The guided light 104 in the light guide 110 may be introduced or coupled into the light guide 110 at the non-zero propagation angle (e.g., about 30-35 degrees). One or more of a lens, a mirror or similar reflector (e.g., a tilted reflector), diffraction grating, and a prism (not illustrated) may facilitate coupling light into an input end of the light guide 110 as the guided light 104 at the non-zero propagation angle, according to various examples. Once coupled into the light guide 110, the guided light 104 propagates along the light guide 110 in a direction that may be generally away from the input end (e.g., illustrated by bold arrow(s) pointing along an x-axis in FIGS. 3 and 4A).

Further, the guided light 104 or equivalently a guided light 104 produced by coupling light into the light guide 110 may be a collimated light beam, according to various embodiments. Herein, a 'collimated light' or 'collimated light beam' is generally defined as a beam of light in which rays of the light beam are substantially parallel to one another within the light beam (e.g., the guided light 104). Further, rays of light that diverge or are scattered from the collimated light beam are not considered to be part of the collimated light beam, by definition herein. In some embodiments, the multiview backlight 100 may include a collimator, such as a lens, reflector or mirror, as described above, (e.g., tilted collimating reflector) to collimate the light, e.g., from a light source. In some embodiments, the light source comprises a collimator. The collimated light provided to the light guide 110 is a collimated guided light 104 or collimated guided light beam. The guided light 104 may be collimated according to or having a collimation factor σ, in some embodiments.

In some embodiments, the light guide 110 may be configured to 'recycle' the guided light 104. In particular, the guided light 104 that has been guided along the light guide length may be redirected back along that length in another propagation direction 103' that differs from the propagation direction 103. For example, the light guide 110 may include a reflector (not illustrated) at an end of the light guide 110 opposite to an input end adjacent to the light source. The reflector may be configured to reflect the guided light 104 back toward the input end as recycled guided light. Recycling guided light 104 in this manner may increase a brightness of the multiview backlight 100 (e.g., an intensity of the tilted plurality of directional light beams 102) by making guided light available more than once, for example, to multibeam elements, described below.

In FIG. 3, a bold arrow indicating a propagation direction 103' of recycled guided light (e.g., directed in a negative x-direction) illustrates a general propagation direction of the recycled guided light within the light guide 110. Alternatively (e.g., as opposed to recycling guided light), guided light 104 propagating in the other propagation direction 103' may be provided by introducing light into the light guide 110 with the other propagation direction 103' (e.g., in addition to guided light 104 having the propagation direction 103).

Referring again to FIGS. 3 and 4A-4C, the multiview backlight 100 further comprises a multibeam element 120. According to various embodiments, the multibeam element 120 is configured to couple out a portion of the guided light 104 as the tilted plurality of directional light beams 102. In particular, FIGS. 3, 4A and 4C illustrate the tilted plurality of directional light beams 102 as a plurality of diverging arrows directed way from the first (or front) surface 110' of the light guide 110.

According to various embodiments, the multibeam element 120 has a physical displacement or offset 126 from a centerline 106a of a corresponding multiview pixel 106. The offset 126 is configured to provide the tilt or tilt angle φ of the tilted plurality of directional light beams 102. Moreover, the tilt angle φ corresponds to direction of a view zone 124 of a multiview display and the different principal angular directions within the view zone 124 correspond to a set of views of a multiview display within that view zone 124. According to various embodiments, the tilted plurality of directional light beams 102 pass through and may be modulated by different ones of the light valves 108 in multiview pixel 106.

Note that the multiview views or multiview images in various different view zones 124 may correspond to the same or different image content, according to different embodiments. In particular, a multiview image provided by the multiview display in a view zone 124 may comprise content that differs from content of a multiview image provided by the multiview display in another view zone. In other examples, the content may be similar or even identical between different view zones.

In some embodiments, the multiview backlight 100 comprises a plurality of multibeam elements 120, e.g., as illustrated in FIGS. 4A-4C. Multibeam elements 120 of the multibeam element plurality are spaced apart from one another along the light guide length, according to various embodiments. In particular, the multibeam elements 120 are separated from one another and represent individual, distinct elements along the light guide length. Further, by definition herein, the multibeam elements 120 are spaced apart from one another according to a finite (i.e., non-zero) inter-element distance (e.g., a finite center-to-center distance). Moreover, the multibeam elements 120 of the multibeam element plurality generally do not intersect, overlap or otherwise touch one another, by definition herein. That is, each multibeam element 120 is generally distinct and separated from other ones of the multibeam elements 120 in the multibeam element plurality.

According to various embodiments, a size of the multibeam element 120 may be comparable to a size of a sub-pixel in a multiview pixel of a multiview display. This configuration may provide an optimal or near optimal beam width or beam overlap of various directional tilted plurality of directional light beams 102 used in the multiview display. For the purpose of discussion, FIG. 3 illustrates a multiview pixel 106 comprising sub-pixels (or light valves 108) along with the multiview backlight 100. FIGS. 4A-4C illustrate a plurality of multiview pixels 106 as well as sub-pixel 106' and light valves 108.

The 'size' of the multibeam element 120 may be defined in any of a variety of manners to include, but not be limited to, a length, a width or an area. For example, the size of a sub-pixel 106' may be a length thereof and the comparable size of the multibeam element 120 may also be a length of the multibeam element 120. In another example, size may refer to an area such that an area of the multibeam element 120 may be comparable to an area of the sub-pixel 106' (or equivalently an area of a light valve 108).

In some embodiments, the size of the multibeam element 120 is comparable to the sub-pixel size such that the multibeam element size is between about fifty percent (50%) and about two hundred percent (200%) of the sub-pixel size. For example, if the multibeam element size is denoted 's' and the sub-pixel size is denoted 'S' (e.g., as illustrated in FIG. 4A), then the multibeam element size s may be given by equation (2) as $$\tfrac{1}{2}S \le s \le 2S \qquad (2)$$

In other examples, the multibeam element size is greater than about sixty percent (60%) of the sub-pixel size, or about seventy percent (70%) of the sub-pixel size, or greater than about eighty percent (80%) of the sub-pixel size, or greater than about ninety percent (90%) of the sub-pixel size, and the multibeam element is less than about one hundred eighty percent (180%) of the sub-pixel size, or less than about one hundred sixty percent (160%) of the sub-pixel size, or less than about one hundred forty (140%) of the sub-pixel size, or less than about one hundred twenty percent (120%) of the sub-pixel size. For example, by 'comparable size', the multibeam element size may be between about seventy-five percent (75%) and about one hundred fifty (150%) of the sub-pixel size. In another example, the multibeam element 120 may be comparable in size to the sub-pixel 106' where the multibeam element size is between about one hundred twenty-five percent (125%) and about eighty-five percent (85%) of the sub-pixel size. According to some embodiments, the comparable sizes of the multibeam element 120 and the sub-pixel 106' may be chosen to reduce, or in some examples to minimize, dark zones between views of the multiview display, while at the same time reducing, or in some examples minimizing, an overlap between views of the multiview display.

FIGS. 3 and 4A-4C further illustrate along with the multiview backlight 100 a plurality of light valves 108 arranged as an array (i.e., a light valve array). As illustrated, the light valves 108 of the light valve array are configured to modulate directional light beams 102 of the tilted directional light beam plurality. The light valve array may be part of a multiview display that employs the multiview backlight, for example. In various embodiments, different types of light valves may be employed as the light valves 108 of the light valve array including, but not limited to, one or more of liquid crystal light valves, electrophoretic light valves, and light valves based on electrowetting.

As illustrated in FIGS. 3 and 4A-4C, directional light beams 102 of the tilted light beam plurality, which collectively have tilt angles (e.g., such as tilt angle φ illustrated in FIG. 3) relative to a surface normal of a multiview display as well as the different principal angular directions, pass through and may be modulated by different ones of the light valves 108 in the light valve array. Note that multibeam elements 120 have offsets 126 from a centerline (e.g., centerline 106a) of respective or corresponding multiview pixels 106. The offset 126 is configured to provide the tilt or determine the tilt angle φ of the tilted plurality of directional light beams 102, according to various embodiments. Further, as illustrated, a light valve 108 of the array corresponds to a sub-pixel 106', and a set of the light valves 108 corresponds to a multiview pixel 106 of a multiview display. In particular, a different set of light valves 108 of the light valve array is configured to receive and modulate the tilted plurality of directional light beams 102 from different ones of the multibeam elements 120, i.e., there is one unique set of light valves 108 for each multibeam element 120, as illustrated.

For example, as illustrated in FIG. 4A, a first light valve set 108a is configured to receive and modulate the tilted plurality of directional light beams 102 from a first multibeam element 120a, while a second light valve set 108b is configured to receive and modulate the tilted plurality of directional light beams 102 from a second multibeam element 120b. Thus, each of the light valve sets (e.g., the first and second light valve sets 108a, 108b) in the light valve array corresponds, respectively, to a different multiview pixel 106, with individual light valves 108 of the light valve sets corresponding to the sub-pixels 106' of the respective multiview pixels 106, as illustrated in FIG. 4A.

As illustrated, the first multibeam element 120a may be a member of a first set of multibeam elements of a multibeam element array. The second multibeam element 120b may be a member of a second set of multibeam elements of the multibeam element array, in some embodiments. Similarly, the first light valve set 108a may be member of a first set of multiview pixels corresponding to or associated with the first set of multibeam elements, while the second light valve set 108b may be a member of a second set of multiview pixels corresponding to the second set of multibeam elements, for example.

Note that, as illustrated in FIGS. 4A-4B, the size of a sub-pixel 106' (i.e., labeled 's') may correspond to a size of a light valve 108 in the light valve array (i.e., labeled 'S'). In other examples, the sub-pixel size may be defined as a distance (e.g., a center-to-center distance) between adjacent light valves 108 of the light valve array. For example, the light valves 108 may be smaller than the center-to-center distance between the light valves 108 in the light valve array. The sub-pixel size may be defined as either the size of the light valve 108 or a size corresponding to the center-to-center distance between the light valves 108, for example.

As illustrated in FIG. 4B, each multiview pixel 106 comprising a different set of light valves 108 may be associated with a corresponding one of multibeam elements 120 (illustrated by the dashed lines around multiview pixels 106). In FIG. 4A, offsets 126 result in the tilted plurality of directional light beams from each multibeam element 120 being modulated by an adjacent multiview pixel 106. Moreover, as illustrated in FIGS. 3 and 4A, the tilted plurality of directional light beams 102 from each of multibeam elements 120 may be directed towards (i.e., may have tilt angle φ) corresponding view zones of a multiview display. Further, as shown in FIG. 4A, the tilted plurality of directional light beams 102 from alternating multibeam elements 120 may be similarly directed towards alternating multiview pixels 106 (i.e., multibeam elements 120 and corresponding multiview pixels associated with different view zones may be interleaved).

In some embodiments, a shape of the multibeam element 120 is analogous to a shape of the multiview pixel 106 or equivalently, a shape of a set (or 'sub-array') of the light valves 108 corresponding to the multiview pixel 106. For example, the multibeam element 120 may have a square shape and the multiview pixel 106 (or an arrangement of a corresponding set of light valves 108) may be substantially square. In another example, the multibeam element 120 may have a rectangular shape, i.e., may have a length or longitudinal dimension that is greater than a width or transverse dimension. In this example, the multiview pixel 106 (or equivalently the arrangement of the set of light valves 108) corresponding to the multibeam element 120 may have an analogous rectangular shape. FIG. 4B illustrates a top or plan view of square-shaped multibeam elements 120 and corresponding square-shaped multiview pixels 106 comprising square sets of light valves 108. In yet other examples (not illustrated), the multibeam elements 120 and the corresponding multiview pixels 106 have various shapes including or at least approximated by, but not limited to, a triangular shape, a hexagonal shape, and a circular shape.

Further (e.g., as illustrated in FIG. 4A), each multibeam element 120 is configured to provide tilted plurality of directional light beams 102 to one and only one multiview pixel 106, according to some embodiments. In particular, for a given one of the multibeam elements 120, the tilted plurality of directional light beams 102 having a principal angular direction in a view direction of the multiview display are substantially confined to a single corresponding multiview pixel 106 and the sub-pixels 106' thereof, i.e., a single set of light valves 108 corresponding to the multibeam element 120, as illustrated in FIG. 4A. As such, each multibeam element 120 of the multiview backlight 100 may provide a corresponding set of tilted plurality of directional light beams 102 that has a principal angular direction in one of the different views of the multiview display.

Note that, while the tilted directional light beam pluralities are illustrated in FIG. 4A as having tilt angles with a common magnitude and opposite signs, in other embodiments one or both of the magnitudes and signs of tilt angles may be different from each other. In particular, pairs of multibeam elements 120 may provide corresponding tilted pluralities of directional light beams 102 to adjacent multiview pixels 106. However, different offsets 126a, 126b of multibeam elements 120a, 120b relative to centerlines of multiview pixels 106 may result in tilt angles of the tilted plurality of directional light beams 102 that are different from one another, according to some embodiments. The different tilt angles may accommodate differences in locations of view zones, for example.

Further, in some embodiments, offsets 126 of the multibeam elements 120 relative to the multiview pixel centerlines may vary along a length of the light guide 110. As such, a continuous or sequential variation, or different offset magnitudes as well as signs for multibeam elements 120 may provide tilted pluralities of directional light beams 102 having tilt angles for the different views or view directions located in different view zones of a multiview display. In some embodiments, offsets 126 may be varied along the length of the light guide 110 in order to focus or converge the tilted plurality of directional light beams 102 at a finite distance from a multiview display, for example.

As described above, the tilt angle φ of a tilted plurality of directional light beams 102 is provided by the offset between the multibeam element 120 and a centerline 106a of a corresponding multiview pixel 106. Further, in some embodiments, the multibeam element 120 itself may also provide a tilted emission pattern. In particular, the multibeam element 120 may be configured to provide a tilted emission pattern that corresponds to or is commensurate with the tilt angle φ of the tilted plurality of directional light beams 102, according to some embodiments. For example, FIGS. 3, 4A, and 4C may illustrate both a tilted emission pattern of the multibeam element 120 and the tilt of the tilted directional light beam plurality resulting from the multibeam element offset(s) 126, 126a, 126b. According to various embodiments, a characteristic of the multibeam element 120 may be configured to provide the tilted emission pattern of the multibeam element 120. The characteristic may be dependent on a particular structure or type of the multibeam element 120, according to various embodiments.

In particular, the multibeam elements 120 may comprise any of a number of different structures or types configured to couple out or scatter out a portion of the guided light 104. For example, the different structures may include, but are not limited to, diffraction gratings, micro-reflective elements, micro-refractive elements, or various combinations thereof. Further, when diffraction gratings are employed, the multibeam element 120 may be configured to diffractively couple out the guided light portion as the tilted plurality of directional light beams 102 having the tilted emission pattern. Likewise, embodiments in which the multibeam element 120 comprise a micro-reflective element, the micro-reflective element may be configured to reflectively couple out the guided light portion as the tilted plurality of directional light beams 102 having the tilted emission pattern. Finally, in embodiments where the multibeam element 120 comprises a micro-refractive element, the guided light portion may be coupled or scattered out as the tilted plurality of directional light beams 102 having the tilted emission pattern by or using refraction (i.e., refractively couple out the guided light portion).

Figure 5A:
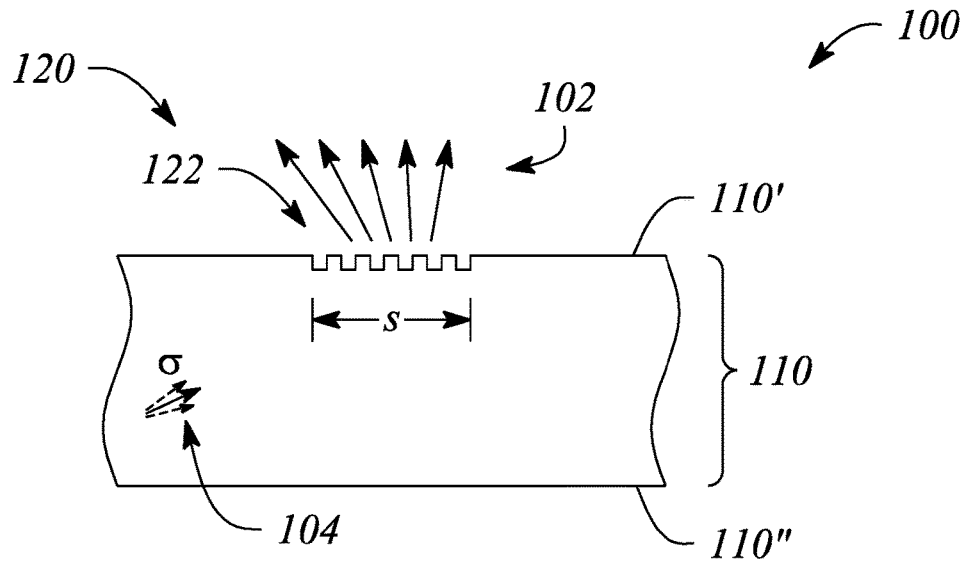
FIG. 5A illustrates a cross sectional view of a portion of a multiview backlight including a multibeam element in an example, according to an embodiment consistent with the principles described herein.
Figure 5B:
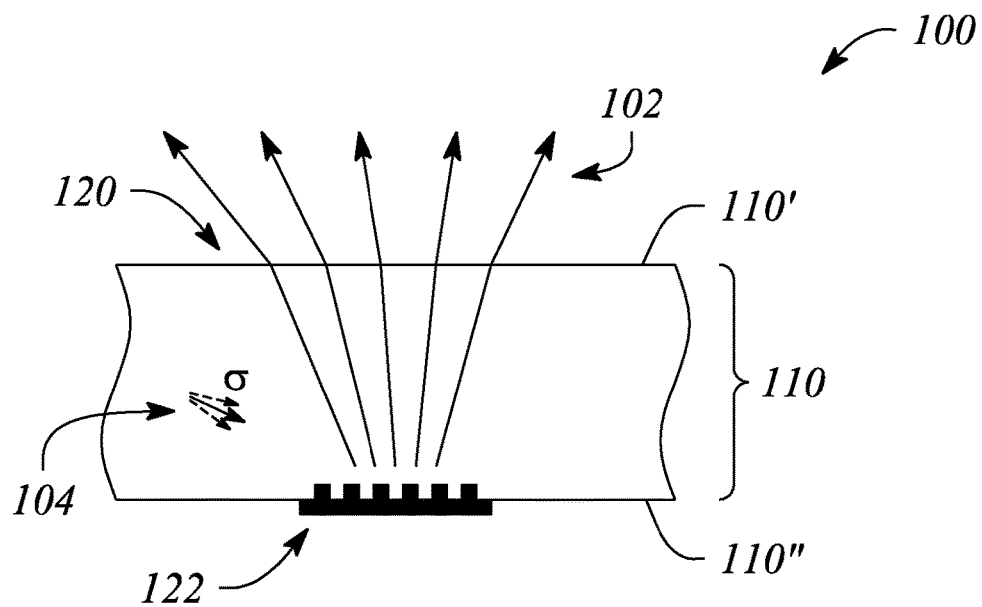
FIG. 5B illustrates a cross sectional view of a portion of a multiview backlight including a multibeam element in an example, according to an embodiment consistent with the principles described herein.

FIG. 5A illustrates a cross sectional view of a portion of a multiview backlight 100 including a multibeam element 120 in an example, according to an embodiment consistent with the principles described herein. FIG. 5B illustrates a cross sectional view of a portion of a multiview backlight 100 including a multibeam element 120 in an example, according to another embodiment consistent with the principles described herein. In particular, FIGS. 5A-5B illustrate the multibeam element 120 of the multiview backlight 100 comprising a diffraction grating 122. The diffraction grating 122 is configured to diffractively couple out (or equivalently diffractively scatter out) a portion of the guided light 104 as the tilted plurality of directional light beams 102. The diffraction grating 122 comprises a plurality of diffractive features spaced apart from one another by a diffractive feature spacing (which is sometimes referred to as a 'grating spacing') or a diffractive grating pitch configured to provide diffractive coupling out of the guided light portion.

According to various embodiments, the spacing or grating pitch of the diffractive features in the diffraction grating 122 may be sub-wavelength (i.e., less than a wavelength of the guided light 104). Note that FIGS. 5A-5B illustrate the diffraction grating 122 having a single grating spacing (i.e., a constant grating pitch), for simplicity of illustration and not by way of limitation. However, in various embodiments, as described below, the diffraction grating 122 may include a plurality of different grating spacings (e.g., two or more grating spacings) or a variable grating spacing or pitch to provide the tilted emission pattern illustrated in FIGS. 5A-5B.

In some embodiments, the diffraction grating 122 of the multibeam element 120 may be located at or adjacent to a surface of the light guide 110. For example, the diffraction grating 122 may be at or adjacent to the first surface 110' of the light guide 110, as illustrated in FIG. 5A. The diffraction grating 122 at light guide first surface 110' may be a transmission mode diffraction grating configured to diffractively couple out the guided light portion through the first surface 110' as the tilted plurality of directional light beams 102, e.g., based on an offset of the multibeam element 120 relative to a corresponding multiview pixel centerline. In another example, as illustrated in FIG. 5B, the diffraction grating 122 of the multibeam element 120 may be located at or adjacent to the second surface 110" of the light guide 110. When located at the second surface 110", the diffraction grating 122 may be a reflection mode diffraction grating. As a reflection mode diffraction grating, the diffraction grating 122 is configured to both diffract the guided light portion and reflect the diffracted guided light portion toward the first surface 110' to exit through the first surface 110' as the diffractively tilted plurality of directional light beams 102, e.g., based on an offset of multibeam element 120 relative to a corresponding multiview pixel.

In other embodiments (not illustrated), the diffraction grating may be located between the surfaces of the light guide 110, e.g., as one or both of a transmission mode diffraction grating and a reflection mode diffraction grating. Note that, in some embodiments described herein, the principal angular directions of the tilted plurality of directional light beams 102 may include an effect of refraction due to the tilted plurality of directional light beams 102 exiting the light guide 110 at a light guide surface. For example, FIG. 5B illustrates refraction (i.e., bending) of the tilted plurality of directional light beams 102 due to a change in refractive index as the tilted plurality of directional light beams 102 cross the first surface 110', by way of example and not limitation.

According to some embodiments, the diffractive features of the diffraction grating 122 may comprise one or both of grooves and ridges that are spaced apart from one another. The grooves or the ridges may comprise a material of the light guide 110, e.g., may be formed in a surface of the light guide 110. In another example, the grooves or the ridges may be formed from a material other than the light guide material, e.g., a film or a layer of another material on a surface of the light guide 110. By definition, the scattering characteristic of the multibeam element 120 comprising a diffraction grating (e.g., diffraction grating 122) includes diffraction (e.g., diffractive coupling or diffractive scattering) by, from or through the diffraction grating. For example, a phase function (e.g., grating pitch or diffractive feature spacing) may be configured or adjusted to steer or tilt an emission pattern of light by diffractive coupling toward a center of a view zone. In other words, the tilt of the tilted plurality of directional light beams 102 may be provided by (or controlled by) selecting an appropriate diffractive scattering characteristic of the diffraction grating 122. FIGS. 5A-5B illustrate an example of the tilt being provided by the scattering characteristic (e.g., diffractive scattering) of the multibeam element 120 comprising the diffraction grating 122.

In some embodiments, the diffraction grating 122 may be or comprise a variable or chirped diffraction grating configured to provide the tilted emission pattern. By definition, the 'chirped' diffraction grating is a diffraction grating exhibiting or having a diffraction spacing of the diffractive features (i.e., the grating pitch) that varies across an extent or length of the chirped diffraction grating. Further, in some embodiments, the chirped diffraction grating may have or exhibit a chirp of the diffractive feature spacing that varies linearly with distance. As such, the chirped diffraction grating is a 'linearly chirped' diffraction grating, by definition. In other embodiments, the chirped diffraction grating of the multibeam element 120 may exhibit a non-linear chirp of the diffractive feature spacing. Various non-linear chirps may be used including, but not limited to, an exponential chirp, a logarithmic chirp or a chirp that varies in another, substantially non-uniform or random but still monotonic manner. Non-monotonic chirps such as, but not limited to, a sinusoidal chirp or a triangle or sawtooth chirp, may also be employed. Combinations of any of these types of chirps may also be employed. In other embodiments (not illustrated), the diffraction grating of the multibeam element 120 configured to provide the tilted emission pattern is or comprises a plurality of diffraction gratings. In some embodiments, individual diffraction gratings of the plurality of diffraction gratings may be superimposed on one another. In other embodiments, the diffraction gratings may be separate diffraction gratings arranged next to one another, e.g., as an array.

Figure 6:
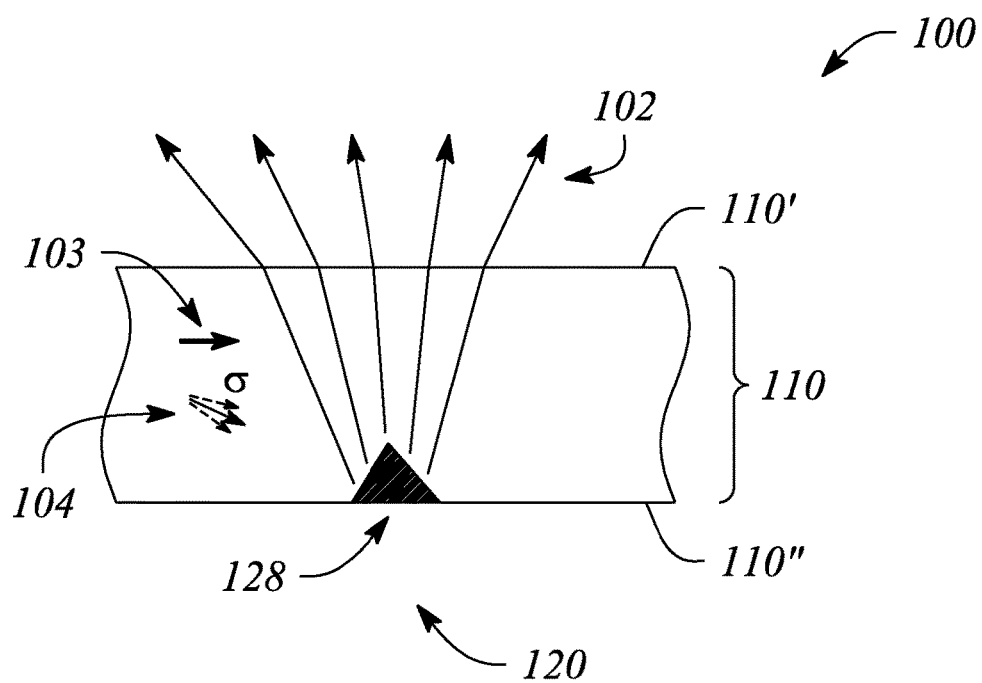
FIG. 6 illustrates a cross sectional view of a portion of a multiview backlight including a multibeam element in an example, according to an embodiment consistent with the principles described herein.

FIG. 6 illustrates a cross sectional view of a portion of a multiview backlight 100 including a multibeam element 120 in an example, according to an embodiment consistent with the principles described herein. In particular, FIG. 6 illustrates the multibeam element 120 comprising a micro-reflective element 128. Micro-reflective elements 128 used as or in the multibeam element 120 may include, but are not limited to, a reflector that employs a reflective material or layer thereof (e.g., a reflective metal) or a reflector based on total internal reflection (TIR). According to some embodiments (e.g., as illustrated in FIG. 6), the multibeam element 120 comprising the micro-reflective element 128 may be located at or adjacent to a surface (e.g., the second surface 110") of the light guide 110. In other embodiments (not illustrated), the micro-reflective element may be located within the light guide 110 between the first and second surfaces 110', 110".

In particular, FIG. 6 illustrates the multibeam element 120 comprising a micro-reflective element 128 having a reflective facet (e.g., a 'prismatic' microreflective element). The facet of the illustrated prismatic micro-reflective element 128 is configured to reflect (i.e., reflectively couple) the portion of the guided light 104 out of the light guide 110. The facet may be slanted or tilted (i.e., have a tilt angle) relative to a propagation direction of the guided light 104 to reflect the guided light portion out of light guide 110, for example. The facet may be formed using a reflective material within the light guide 110 (e.g., as illustrated in FIG. 6) or may be surfaces of a prismatic cavity in the second surface 110", according to various embodiments. When a prismatic cavity is employed, either a refractive index change at the cavity surfaces may provide reflection (e.g., TIR reflection) or the cavity surfaces that form the facets may be coated by a reflective material to provide reflection, in some embodiments. Further in FIG. 6, the micro-reflective element 128 of the multibeam element 120 is illustrated having an asymmetrical facet. The asymmetrical facet is configured to provide the tilted emission pattern, according to various embodiments.

The multiview backlight 100 may further comprise a light source 130. According to various embodiments, the light source 130 is configured to provide the light to be guided within light guide 110. In particular, the light source 130 may be located adjacent to an entrance surface or end (input end) of the light guide 110, e.g., as illustrated in FIGS. 3 and 4A-4C. In various embodiments, the light source 130 may comprise substantially any source of light (e.g., optical emitter) including, but not limited to, one or more light emitting diodes (LEDs) or a laser (e.g., laser diode). In some embodiments, the light source 130 may comprise an optical emitter configured produce a substantially monochromatic light having a narrowband spectrum denoted by a particular color. In particular, the color of the monochromatic light may be a primary color of a particular color space or color model (e.g., an RGB color model). In other examples, the light source 130 may be a substantially broadband light source configured to provide substantially broadband or polychromatic light. For example, the light source 130 may provide white light or light that is substantially white. In some embodiments, the light source 130 may comprise a plurality of different optical emitters configured to provide different colors of light. The different optical emitters may be configured to provide light having different, color-specific, non-zero propagation angles of the guided light corresponding to each of the different colors of light. Likewise, color-specific collimation factors may be provided by the light source 130, in some embodiments.

In some embodiments, the light source 130 may further comprise a collimator to efficiently couple light into light guide 110. The collimator may be configured to receive substantially uncollimated light from one or more of the optical emitters of the light source 130. The collimator is further configured to convert the substantially uncollimated light into collimated light. In particular, the collimator may provide collimated light having the non-zero propagation angle and being collimated according to a predetermined collimation factor σ, according to some embodiments. Moreover, when optical emitters of different colors are employed, the collimator may be configured to provide the collimated light having one or both of different, color-specific, non-zero propagation angles and having different color-specific collimation factors. The collimator is further configured to communicate the collimated light beam to the light guide 110 to propagate as the guided light 104, described above.

In some embodiments, the multiview backlight 100 is configured to be substantially transparent to light in a direction through the light guide 110 orthogonal to a propagation direction 103, 103' of the guided light 104. In particular, the light guide 110 and the spaced apart plurality of multibeam elements 120 allow light to pass through the light guide 110 through both the first surface 110' and the second surface 110", in some embodiments. Transparency may be facilitated, at least in part, due to both the relatively small size of the multibeam elements 120 and the relative large inter-element spacing (e.g., one-to-one correspondence with multiview pixels 106) of the multibeam element 120. Further, especially when the multibeam elements 120 comprise diffraction gratings, the multibeam elements 120 may also be substantially transparent to light propagating orthogonal to the light guide surfaces 110', 110", according to some embodiments.

In accordance with some embodiments of the principles described herein, a multiview display is provided. In particular, the multiview display may be configured to provide a multiview image to a plurality of different view zones that are spatially separated from one another. Moreover, the multiview display may provide multiview images simultaneously to the different view zones, in some embodiments. As such, the multiview display may be referred to as a 'multi-zone' multiview display, according to various embodiments. For example, when the multiview display is configured to provide two multiview images to two different, spatially separated view zones, the multiview display may be referred to as a 'dual view' or 'dual zone' multiview display.

According to various embodiments, the multiview display is configured to emit a tilted plurality of directional light beams that are modulated as pixels of the multiview display. Further, the emitted tilted plurality of directional light beams has a tilt or tilt angle configured to preferentially direct the tilted directional light beam plurality toward a view zone of the multiview display based on a tilt angle of the tilted directional light beam plurality. As mentioned above, the multiview display may be configured to provide a plurality of view zones. Thus, the tilted plurality of directional light beams may preferentially directed to a predetermined one of the view zone plurality, according to various embodiments.

In various embodiments, the tilt of the directional light beam plurality may be provided by offsets between multibeam elements and corresponding multiview pixels in the multiview display. Further, the multibeam elements are configured to produce directional light beams of the directional light beam plurality having different principal angular directions from one another about or relative to a central ray or direction of the tilted plurality of directional light beams. The different principal angular directions of the directional light beams correspond to different viewing directions for different views in a set of views of the multiview display within a particular view zone, in various embodiments.

In some examples, the multiview display is configured to provide or 'display' a 3D or multiview image to the various view zone(s). Different ones of the modulated, differently directed light beams may correspond to individual pixels of different 'views' associated with the multiview image, according to various examples. The different views may provide a 'glasses free' (e.g., autostereoscopic) representation of information in the multiview image being displayed by the multiview display, for example.

Figure 7:
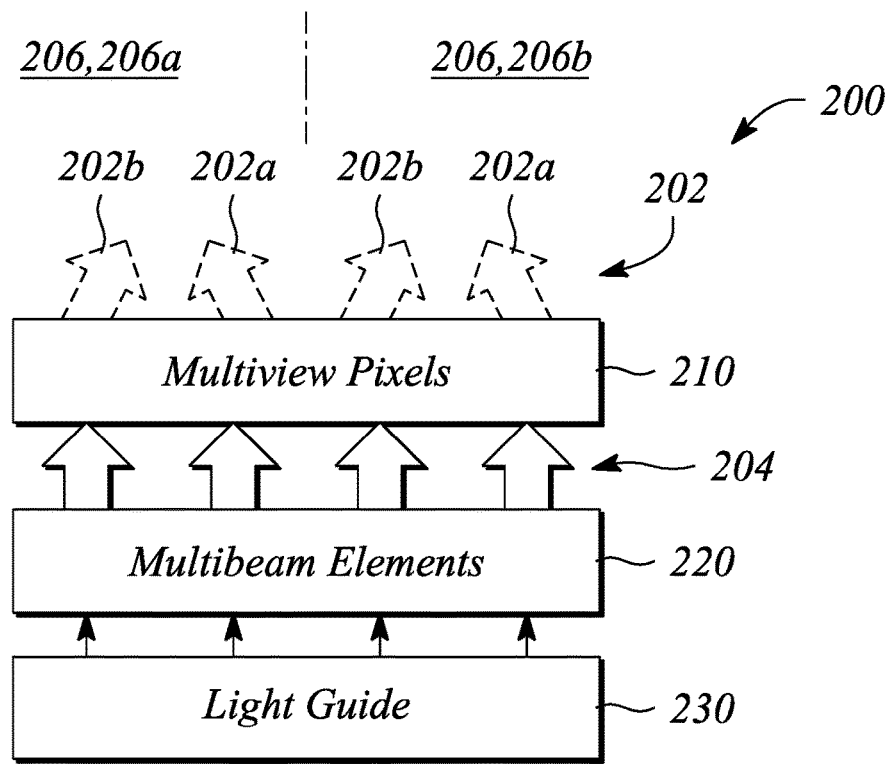
FIG. 7 illustrates a block diagram of a multiview display in an example, according to an embodiment consistent with the principles described herein.

FIG. 7 illustrates a block diagram of a multiview display 200 in an example, according to an embodiment consistent with the principles described herein. According to various embodiments, the multiview display 200 is configured to display a multiview image according to different views in different view directions. In particular, a tilted modulated plurality of directional light beams 202 emitted by the multiview display 200 may be used to display the multiview image and may correspond to pixels of the different views (i.e., view pixels). The tilted modulated plurality of directional light beams 202 are illustrated as arrows emanating from multiview pixels 210 in FIG. 7. Dashed lines are used for the arrows of the tilted modulated plurality of directional light beams 202 to emphasize the modulation thereof by way of example and not limitation.

Further illustrated, by way of example and not limitation, is a pair of view zones 206. In particular, FIG. 7 illustrates a first view zone 206a and a second view zone 206b. As such, the illustrated multiview display 200 in FIG. 7 may serve as a dual view multiview display. According to various embodiments, the multiview display 200 is configured to provide a multiview image to each view zone 206, e.g., each of the first and second view zones 206a, 206b. In some embodiments, the multiview image provided by the multiview display 200 to the first view zone 206a may be different from the multiview image provided to the second view zone 206b. For example, a first multiview image provided to the first view zone 206a may comprise data (e.g., location data, graphical performance data, etc.) intended for viewing and use by a driver of an automobile. The second multiview image provided to the second view zone 206b may include entertainment content (e.g., a movie, a video game, etc.) intended for viewing by a passenger of the automobile, for example. In other embodiments, the multiview images in each of the view zones 206 may be substantially similar. Further, a first tilted modulated plurality of directional light beams 202a may correspond to or be directed toward the first view zone 206a by a respective tilt thereof. Similarly, a second tilted modulated plurality of directional light beams 202b may correspond to or be directed toward the second view zone 206b by a respective tilt thereof. The first and second tilted modulated plurality of directional light beams 202a, 202b may be subsets of the tilted modulated directional light beams 202, according to various embodiments.

The multiview display 200 illustrated in FIG. 7 comprises an array of the multiview pixels 210. The multiview pixels 210 of the array are configured to provide a plurality of different views of the multiview display 200. According to various embodiments, a multiview pixel 210 of the array comprises a plurality of sub-pixels or equivalently a plurality of light valves configured to modulate a tilted plurality of directional light beams 204 and produce the tilted modulated plurality of directional light beams 202 emitted by the multiview display 200. In some embodiments, the multiview pixel 210 is substantially similar to a set of light valves 108 of the array of light valves 108, described above with respect to the multiview backlight 100. In particular, a sub-pixel or light valve of the multiview pixel 210 may be substantially similar to the above-described light valve 108. That is, a multiview pixel 210 of the multiview display 200 may comprises a set of light valves (e.g., a set of light valves 108), and a sub-pixel of the multiview pixel 210 may comprise a light valve (e.g., a single light valve 108) of the set.

According to various embodiments, the multiview display 200 illustrated in FIG. 7 further comprises an array of multibeam elements 220. Each multibeam element 220 of the array is configured to provide the tilted plurality of directional light beams 204 to a corresponding multiview pixel 210. In particular, each multibeam element 220 is offset from a centerline of the corresponding multiview pixel 210, which gives rise to a tilt angle of the tilted plurality of directional light beams 204. That is, a tilt angle of the tilted directional light beam plurality is determined by an offset between the multibeam element and the corresponding multiview pixel. Moreover, directional light beams of the tilted plurality of directional light beams 204 may have different principal angular directions from one another about the tilt angle. Further, the different principal angular directions correspond to different views directions of different views in a set of views of a multiview display within a view zone 206, according to various embodiments.

Further, in some embodiments, a size of a multibeam element 220 of the multibeam element array is comparable to a size of a sub-pixel (or light valve) of the sub-pixel plurality or multiview pixel. For example, the size of the multibeam element 220 may be greater than one half of the sub-pixel size and less than twice the sub-pixel size, in some embodiments. In some embodiments, there may be a one-to-one correspondence between the multiview pixels 210 of the multiview pixel array and the multibeam elements 220 of the multibeam element array. As such, each sub-pixel in the multiview pixel 210 may be configured to modulate a different one of the tilted plurality of directional light beams 204 provided by a corresponding multibeam element 220. Further, each multiview pixel 210 may be configured to receive and modulate the tilted plurality of directional light beams 204 from one and only one multibeam element 220, according to various embodiments.

In some embodiments, the multibeam element 220 of the multibeam element array may be substantially similar to the multibeam element 120 of the multiview backlight 100, described above. For example, the multibeam element 220 may comprise a diffraction grating substantially similar to the diffraction grating 122, described above, e.g., and illustrated in FIGS. 5A-5B, with respect to the multibeam element 120. In another example, the multibeam element 220 may comprise a micro-reflective element. In yet another example, the multibeam element 220 may comprise a micro-refractive element.

As illustrated in FIG. 7, the multiview display 200 further comprises a light guide 230 configured to guide light. According to various embodiments, the multibeam elements 220 of the element array are configured to couple out a portion of the guided light from the light guide 230 as the tilted plurality of directional light beams 204 provided to the corresponding multiview pixels 210 of the pixel array. In particular, the multibeam elements 220 are optically connected to the light guide 230 to couple out the portion of the guided light. In some embodiments, the light guide of the multiview display 200 may be substantially similar to the light guide 110 described above with respect to the multiview backlight 100. Further, the multibeam elements 220 in combination with the light guide 230 may be substantially similar to the multiview backlight 100.

In some of these embodiments (not illustrated in FIG. 7), the multiview display 200 may further comprise a light source. The light source may be configured to provide the light to the light guide with a non-zero propagation angle and, in some embodiments, is collimated according to a collimation factor (e.g., collimation factor σ) to provide a predetermined angular spread of the guided light within the light guide, for example. According to some embodiments, the light source may be substantially similar to the light source 130 of the multiview backlight 100, described above.

Figure 8:
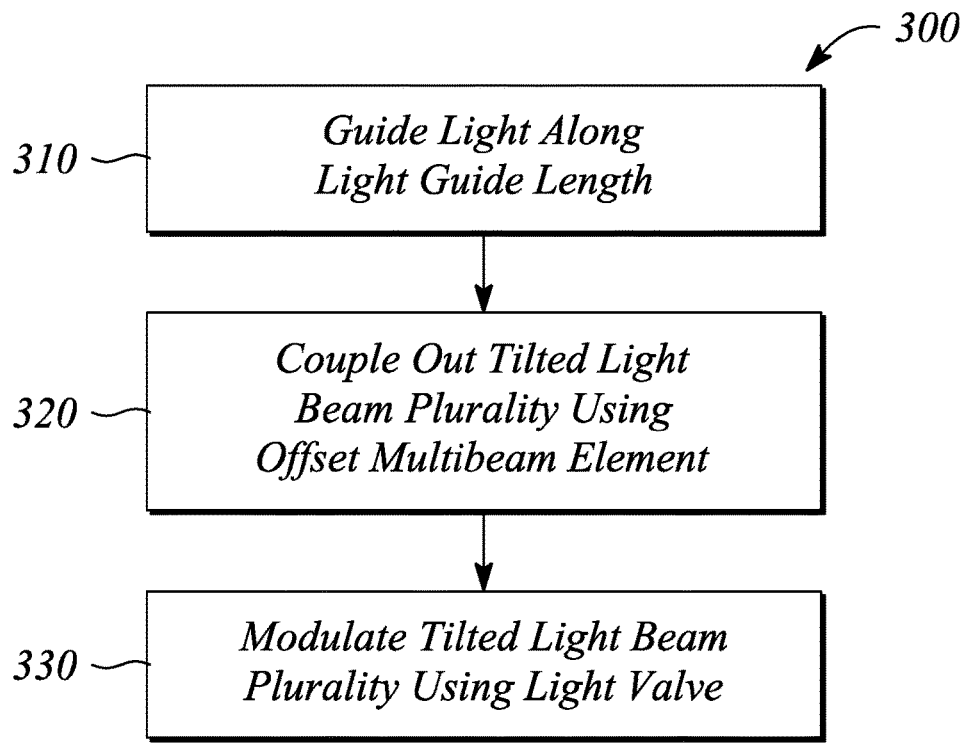
FIG. 8 illustrates a flow chart of a method of multiview display operation in an example, according to an embodiment consistent with the principles described herein.

In accordance with other embodiments of the principles described herein, a method of multiview display operation is provided. FIG. 8 illustrates a flow chart of a method 300 of multiview display operation in an example, according to an embodiment consistent with the principles described herein. As illustrated in FIG. 8, the method 300 of multiview display operation comprises guiding 310 light along a length of a light guide. In some embodiments, the light may be guided 310 at a non-zero propagation angle. Further, the guided light may be collimated according to a predetermined collimation factor. According to some embodiments, the light guide may be substantially similar to the light guide 110 described above with respect to the multiview backlight 100.

As illustrated in FIG. 8, the method 300 of multiview display operation further comprises coupling 320 a portion of the guided light out of the light guide using a multibeam element to provide a tilted plurality of directional light beams. In various embodiments, multibeam elements in the multiview backlight are offset from centerlines of corresponding multiview pixels in a multiview display. That is, coupling 320 out the tilted light beam plurality uses an offset multibeam element and the tilt angle is determined by or corresponds to the offset. Note that the principal angular directions of the tilted directional light beam plurality may correspond to different view directions of different views of a multiview display. Further, the different views directions may be within a view zone of the multiview display. According to various embodiments, a size of the multibeam element is comparable to a size of a sub-pixel in a multiview pixel of the multiview display. For example, the multibeam element may be greater than one half of the sub-pixel size and less than twice the sub-pixel size.

In some embodiments, the multibeam element and the offset thereof relative to the multiview pixel are substantially similar to the multibeam element 120 and offset described above with respect to the multiview backlight 100. For example, the multibeam element may be a member of a plurality or an array of multibeam elements. Further, in some embodiments, the multibeam element may comprise one or more of a diffraction grating, micro-reflective element and a micro-refractive element. Further still, the multibeam element may provide a tilted emission pattern, according to some embodiments.

In particular, the multibeam element used in coupling out 320 guided light may comprise a diffraction grating optically coupled to the light guide to diffractively couple out 320 the guided light portion as the tilted plurality of directional light beams having one or more tilt angles corresponding to one of more view zones of the multiview display. The directional light beams of the tilted plurality of directional light beams produced by the diffraction grating may have different principal angular directions from one another corresponding to different views in a set of views in a view zone. The diffraction grating may be substantially similar to the diffraction grating 122 of the multibeam element 120, for example. In another example, the multibeam element may comprise a micro-reflective element optically coupled to the light guide to reflectively couple out 320 the tilted plurality of directional light beams. In yet another embodiment, the multibeam element may comprise a micro-refractive element optically coupled to the light guide to refractively couple out 320 the tilted plurality of directional light beams.

In some embodiments (not illustrated), the method 300 of multiview display operation further comprises providing light to the light guide using a light source. The provided light may be the guided light that one or both of has a non-zero propagation angle within the light guide and is collimated within the light guide according to a collimation factor to provide a predetermined angular spread of the guided light within the light guide. In some embodiments, the light source may be substantially similar to the light source 130 of the multiview backlight 100, described above.

As illustrated in FIG. 8, the method 300 of multiview display operation further comprises optionally modulating 330 the tilted plurality of directional light beams using light valves configured as a multiview pixel of a multiview display. According to some embodiments, a light valve of a plurality or array of light valves corresponds to the sub-pixel of the multiview pixels. That is, the multibeam element may have a size comparable to a size of the light valves or a center-to-center spacing between the light valves of the plurality for a group of one or more sub-pixels, for example.

According to some embodiments, the plurality of light valves may be substantially similar to the array of light valves 108 described above with respect to the multiview backlight 100. In particular, different sets of light valves may correspond to different multiview pixels in a manner similar to the correspondence of the first and second light valve sets 108a, 108b to different multiview pixels 106, as described above. Further, individual light valves of the light valve array may correspond to a group of one or more sub-pixels of the multiview pixels as a light valve 108 corresponds to a sub-pixel 106' in the above-reference discussion of FIGS. 4A-4C.

Thus, there have been described examples and embodiments of a multiview backlight, a multiview display, and a method of multiview display operation that employ an offset multibeam element to provide a tilted plurality of directional light beams. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A multiview backlight, comprising:
   a light guide configured to guide light as guided light according to total internal reflection; and
   a multibeam element configured to couple out a portion of the guided light as a tilted plurality of directional light beams having different principal angular directions corresponding to view directions of a plurality of views in a view zone of a multiview display, a tilt angle of the tilted plurality of directional light beams being provided by an offset of the multibeam element from a centerline of a corresponding multiview pixel of the multiview display,
   wherein the tilt angle is configured to provide the plurality of views in the view zone of the multiview display.

2. The multiview backlight of claim 1, wherein a size of the multibeam element is comparable to a size of a sub-pixel in a multiview pixel of the multiview display, the multibeam element being between fifty percent and two hundred percent of the sub-pixel size.

3. The multiview backlight of claim 1, wherein the multibeam element comprises a diffraction grating configured to diffractively couple out the portion of the guided light as the tilted plurality of directional light beams according to the offset.

4. The multiview backlight of claim 1, wherein the multibeam element comprises one or both of a micro-reflective element and a micro-refractive element, the micro-reflective element being configured to reflectively couple out a portion of the guided light as the tilted plurality of directional light beams, the micro-refractive element being configured to refractively couple out a portion of the guided light as the tilted plurality of directional light beams.

5. The multiview backlight of claim 1, wherein the multibeam element is further configured to provide a tilted emission pattern, the tilted emission pattern having a tilt angle corresponding to the tilt angle of the tilted plurality of directional light beams.

6. The multiview backlight of claim 1, further comprising another multibeam element configured to couple out from the light guide another portion of the guided light as another tilted plurality of directional light beams having different principal angular directions corresponding to view directions of another plurality of views in another view zone of a multiview display, a tilt angle of the other tilted plurality of directional light beams being provided by an offset of the other multibeam element from a centerline of a multiview pixel corresponding to the other multibeam element,
   wherein the tilt angle of the other tilted plurality of directional light beams is configured to provide the other plurality of views in the other view zone of the multiview display, the view zones being spatially displaced from one another.

7. The multiview backlight of claim 6, wherein a multiview image provided by the multiview display in the view zone comprises content that differs from content of a multiview image provided by the multiview display in the other view zone.

8. The multiview backlight of claim 6, wherein respective offsets of the multibeam element and the other multibeam element have an opposite sign from one another.

9. The multiview backlight of claim 1, further comprising a light source optically coupled to an input of the light guide, the light source being configured to provide light to be guided as the guided light.

10. A multiview display comprising the multiview backlight of claim 1, the multiview display further comprising an array of light valves configured to modulate directional light beams of the tilted plurality of directional light beams, a light valve of the array corresponding to a sub-pixel in a multiview pixel of the multiview display, a set of light valves of the array corresponding to the multiview pixel.

11. A multiview display comprising:
   an array of multiview pixels configured to provide a plurality of different views to a view zone of the multiview display, a multiview pixel of the multiview pixel array comprising a plurality of light valves configured to modulate a tilted plurality of directional light beams having different principal angular directions corresponding to view directions of the different views;
   a light guide configured to guide light as guided light according to total internal reflection; and
   an array of multibeam elements optically coupled to the light guide, each multibeam element of the multibeam element array being configured to provide to a corresponding multiview pixel the tilted directional light beam plurality,
   wherein a tilt angle of the tilted directional light beam plurality is determined by an offset between the multibeam element and the corresponding multiview pixel.

12. The multiview display of claim 11, wherein the multiview display is a multi-zone multiview display having a first view zone and a second view zone spatially offset from the first view zone, a first set of multibeam elements of the multibeam element array and a corresponding first set of multiview pixels to provide a first set of different views to the first view zone and a second set of multibeam elements of the multibeam element array and a corresponding second set of multiview pixels being configured to provide a second set of different views to the second view zone.

13. The multiview display of claim 12, wherein a multiview image provided by the multiview display in the first view zone comprises content that differs from content of a multiview image provided by the multiview display in the second view zone.

14. The multiview display of claim 12, wherein the first view zone of the multi-zone multiview display is configured to be viewable by a driver of an automobile and the second view zone of the multi-zone multiview display is configured to be viewable by a passenger of the automobile.

15. The multiview display of claim 11, wherein a size of the multibeam element is comparable to a size of a light valve of the multiview pixel, the multibeam element being between fifty percent and two hundred percent of the light valve size.

16. The multiview display of claim 11, wherein a multiview element of the multibeam element array comprises one of a diffraction grating, a micro-reflective element and a micro-refractive element configured to couple out a portion of the guided light as the tilted plurality of directional light beams.

17. The multiview display of claim 11, wherein each multibeam element is further configured to provide a tilted emission pattern, a tilt of the tilted emission pattern corresponding to the tilt angle the respective tilted directional light beam plurality.

18. A method of multiview display operation, the method comprising:

guiding light in a propagation direction along a length of a light guide; and coupling a portion of the guided light out of the light guide using a multibeam element to provide a tilted plurality of directional light beams having different principal angular directions corresponding to respective different view directions of a plurality of different views of a multiview display, the tilted plurality of directional light beams having a tilt angle corresponding to an offset of the multibeam element from a centerline of a multiview pixel in the multiview display, wherein the plurality of different views are provided to a view zone of the multiview display.

19. The method of multiview display operation of claim 18, further comprising modulating light beams of the tilted plurality of directional light beams using an array of light valves to provide the different views as multiview images.

20. The method of multiview display operation of claim 18, wherein the multiview display provides a plurality of view zones, the method further comprising displaying a first multiview image in a first view zone and a second multiview image in a second view zone, the first view zone being spatially separated from the second view zone.

* * * * *